US006625753B1

(12) United States Patent
Skogman et al.

(10) Patent No.: US 6,625,753 B1
(45) Date of Patent: Sep. 23, 2003

(54) RECOVERY FACILITY FOR AN SNA COMMUNICATION NETWORK

(75) Inventors: John W. Skogman, Hickory, NC (US); Kenneth H. Warner, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,690

(22) Filed: May 9, 2000

(51) Int. Cl.[7] ................................................ G06F 11/00
(52) U.S. Cl. ............................ 714/13; 714/12; 370/217
(58) Field of Search .............................. 714/10, 12, 13; 370/217

(56) References Cited

U.S. PATENT DOCUMENTS

| | | | | |
|---|---|---|---|---|
| 4,975,914 A | * | 12/1990 | Ashton et al. ................. 714/4 |
| 5,027,269 A | | 6/1991 | Grant et al. ................. 364/200 |
| 5,307,354 A | | 4/1994 | Cramer et al. ............. 371/11.2 |
| 5,384,783 A | | 1/1995 | Satomi et al. ............... 371/9.1 |
| 5,426,773 A | | 6/1995 | Chabanet et al. ............. 395/575 |
| 5,499,342 A | * | 3/1996 | Kurihara et al. ............ 709/227 |
| 5,572,674 A | * | 11/1996 | Ernst ........................... 709/221 |
| 5,621,884 A | * | 4/1997 | Beshears et al. ............. 714/10 |
| 5,828,569 A | * | 10/1998 | Fisher ........................... 700/82 |
| 5,894,547 A | | 4/1999 | Baskey ...................... 395/182.1 |
| 6,061,807 A | * | 5/2000 | Albert et al. ................... 714/3 |
| 6,072,797 A | * | 6/2000 | Fletcher ....................... 370/394 |
| 6,111,852 A | * | 8/2000 | Leung et al. ................ 370/217 |
| 6,449,733 B1 | * | 9/2002 | Bartlett et al. ................ 714/13 |

* cited by examiner

Primary Examiner—Robert Beausoliel
Assistant Examiner—Marc Duncan
(74) Attorney, Agent, or Firm—Lily Neff, Esq.; Andrew Wojnicki, Jr., Esq.; Heslin Rothenberg Farley & Mesiti P.C.

(57) ABSTRACT

A recovery facility is provided for a system network architecture (SNA) communication system employed by a computer network. The recovery facility includes bringing up a backup processor upon detection of failure at an existing processor in the SNA network, wherein both the failing processor and the backup processor support a multi-link transmission group (TG). After bringing up the backup processor, a new communication link is activated between the backup processor and an existing SNA communications controller previously linked to the failing processor. Processing is performed to ensure that the SNA communications controller recognizes the new communication linked to the backup processor as a same subarea address, a same virtual route and a same TG number as the previous link to the failing processor, thereby accomplishing substitution of the backup processor for the failing processor in the SNA communications network without requiring restarting of the entire network.

25 Claims, 4 Drawing Sheets

RECOVERY FACILITY FOR AN SNA COMMUNICATION NETWORK

TECHNICAL FIELD

The present invention relates in general to computer networks, and more particularly, to a recovery facility for a System Network Architecture (SNA) communication system employed by a computer network.

BACKGROUND OF THE INVENTION

Prior art computer networks are controlled by a system architecture which insures the orderly flow of information throughout the system. Systems Network Architecture (SNA) is a system architecture developed by IBM Corporation which controls the configuration and operation of a computer communication network. It provides the description of the logical structure, formats, protocols, and operational sequences for transmitting information units through the network.

The network is composed of nodes interconnected by communications facilities. The nodes may be of widely varying functional capability, ranging from terminals with minimal native processing capability to complex multiprocessors. The communication facilities also come in a number of varieties ranging from highspeed I/O channels to low speed, point-to-point telephone lines and including such media as satellite links and wide-band optical fibers.

Each node is comprised of a physical unit (PU) which controls the physical resources of the node (e.g., links) and one or more logical units (LU) which are used to partition, allocate, and control the devices associated with end-user communications.

The Virtual Telecommunication Access Method (VTAM) is a telecommunications access method software program, developed by IBM Corporation, which is resident in a host processor and provides an interface between the host processor and other resources in the computer network. A VTAM application program is a program that uses VTAM macro instructions to communicate with terminals. VTAM allows a plurality of application programs to be used at a single terminal. An application program within a host processor can be used at any location in the network without the program having any awareness of network organization.

Users in the network communicate by establishing a session between the logical units (LU) that represent them. A session involves a definition of the characteristics of the communications between two end-users. Each logical unit couples a user to the SNA network. Two logical units can have multiple logical connections or parallel sessions established between them.

Conventionally, when a network application fails, all of the sessions of the application are terminated (unbound). Application recovery requires the sessions to be reestablished. This process is slow, thereby causing application recovery to take an unacceptably long time, especially if there was a large number of sessions.

DISCLOSURE OF THE INVENTION

A fault tolerant solution requires two basic ingredients: redundancy and state recording. Redundancy may come in the form of duplicate hardware and software, along with the appropriate access paths (e.g., busses, links, cache, etc.). State recording is a process of recording enough processing state information during normal processing such that when a fault occurs and recovery is invoked, a consistent "next" state can be constructed in order that the process can continue properly.

One solution to this problem has been to add additional hardware and software system elements to create an alternate application subsystem which is kept synchronized with the active subsystem. For example, an alternate processor with the same type of application program can establish back-up sessions for any of the sessions that the primary host processor has active currently. If the primary processor was unable to perform its function for any reason, such as hardware, operating system, VTAM or application failure, the alternate processor could be used immediately to serve the users that had active sessions with the primary processor. A major drawback to this approach, however, is that a complete backup subsystem is needed, as well as a separate back-up session for each active session.

Therefore, one aspect the present invention comprises an enhanced recovery technique for a system network architecture (SNA) communication network. This recovery technique includes: bringing up a backup processor upon detection of a failing processor in the SNA network, wherein both the failing processor and the backup processor support a multi-link transmission group (TG); and activating a new communication link between the backup processor and an SNA communications controller previously linked to the failing processor, wherein the SNA communications controller recognizes that the new communication link to the backup processor has a same subarea address, a same virtual route and a same TG number as the previous link to the failing processor, thereby accomplishing substitution of the backup processor for the failing processor in the SNA communication network.

Systems and computer program products corresponding to the above-outlined recovery facility are also described and claimed herein.

To restate, failure of a host processor can be a time consuming and costly problem within an SNA network. When failure occurs, a new processor may need to be brought in to replace the failed processor. If the failing processor has an SNA network using subarea (PU5) support with links to a communications controller using Network Control Program (NCP), it is conventionally necessary to restart the entire SNA network.

A recovery facility as presented herein advantageously allows the new host processor to acquire the network traffic that was running on the failed processor without requiring restarting of the network. Further, the solution presented herein is simple, building on existing SNA features. The recovery facility presented requires a small amount of processing effort to provide a very powerful and highly desirable capability. Avoiding restart of SNA networks saves customers time and money. Numerous customers run large SNA networks using subarea support and are not likely to migrate to newer communication facilities in the near future.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Generally stated, provided herein is a recovery facility for a failing processor in a system network architecture (SNA) network using subarea (PU5) support with links to communication controllers using Network Control Program (NCP). The recovery facility described herein allows a new processor to acquire the network traffic that was running on the failed processor, thereby avoiding restarting of the entire SNA network. As used herein "failure" is intended to be inclusive of any processor outage, including outages for scheduled maintenance.

Figure 1:
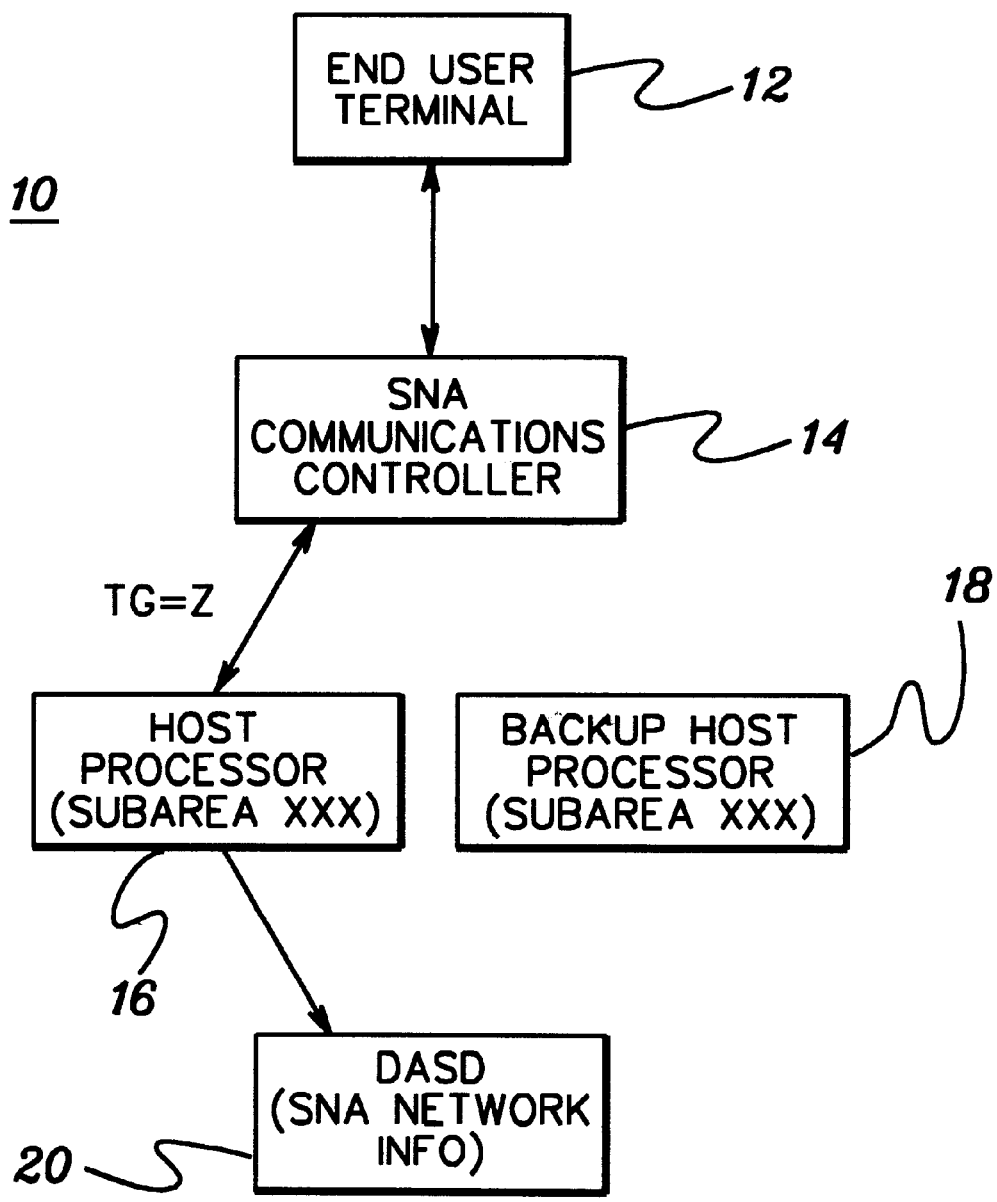
FIG. 1 depicts a communication link between a host processor in an SNA network and an SNA communications controller, as well as persistent storage (DASD), a back-up host processor and an end-user terminal to employ a recovery facility in accordance with the principles of the present invention.

FIG. 1 depicts one embodiment of a system network architecture (SNA) network, generally denoted 10, wherein an end user terminal 12 is coupled to an SNA communications controller 14. Controller 14 communicates with a host processor 16. Host processor 16 is assumed to be running and has an active, channel-attached link to SNA communications controller 14 which is running Network Control Program (NCP). The network is a subarea network, with the host as a PU5 node and the controller as a PU4 node. At least two virtual routes are defined and at least one is active between the host and the communications controller. Multiple logical-unit (LU) to logical-unit SNA sessions are active and using the active virtual route.

As SNA traffic (i.e., Path Information Units (PIUs)) for these LU—LU sessions is received, current LU—LU session information is filed out to persistent storage, e.g., DASD 20, by host processor 16, as is current virtual route information.

For purposes of discussion, the following explanation focuses on a single LU-LU session between a first LU named APPLHOST residing in host processor 16 and a second LU TERMINAL which may, for example, comprise end-user terminal 12 residing out in the network beyond the channel-attached communications controller 14. Assume that host processor 16 is defined as subarea xxx and that the processor hits a condition which causes it to fail. This could be due to program failure, scheduled software or hardware maintenance, etc.

Currently when the host processor fails, the LU—LU session between APPLHOST and TERMINAL is lost unless a second "backup" session is already set up. This backup session requires using additional network resources which may or may not ever be utilized. In accordance with the principles of the present invention, this alternative need for a complete backup subsystem and a "backup" session is eliminated. If a host processor fails, a method is provided herein for swinging the virtual route and LU—LU sessions to a new host processor (i.e., backup host processor 18) which can use a second link to the existing communications controller and keep the sessions running.

This facility is accomplished in part by using "multi-link" transmission group (TG) support when activating the communication link between, for example, host processor 16 and the channel-attached communications controller 14. When the failing host processor 16 originally activates its link to communications controller 14, it needs to perform an exchange identification format 2 (XID2) with the controller. During this exchange, the host supplies the controller with the host's subarea (e.g., subarea xxx), its transmission group number (e.g., TG=Z) and, in one embodiment of the present invention, it would pass an indicator flag stating that this TG is to have multiple links. This multi-link TG support allows a second link between a different host processor and the communication controller to be then activated using the same subarea and TG number as the first host processor.

Figure 2:
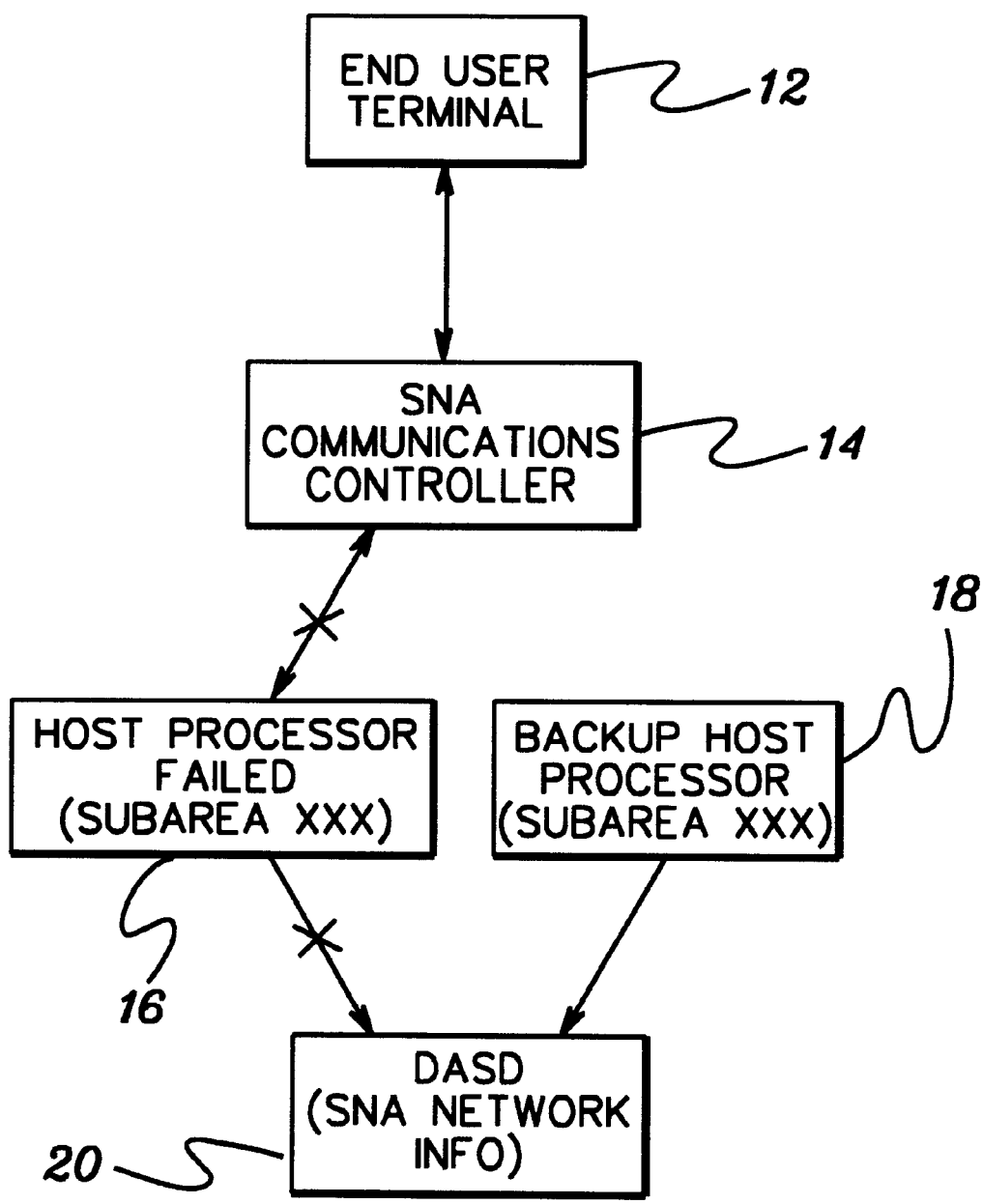
FIG. 2 depicts the SNA communications network of FIG. 1 after the host processor has failed, and the back-up processor has been brought up and requested session information from persistent storage in accordance with the principles of the present invention.

FIG. 2 depicts the SNA network of FIG. 1 after host processor 16 has failed, stalling or disabling the links between the host processor and the communications controller. In accordance with the present invention, if not already active, a new host processor (herein backup host processor 18) is activated. In accordance with the present invention, processor 18 has the same subarea xxx in the network as the failing processor. After being brought up, backup processor 18 accesses SNA network information, including LU—LU session and virtual route information, from persistent storage 20.

Figure 3:
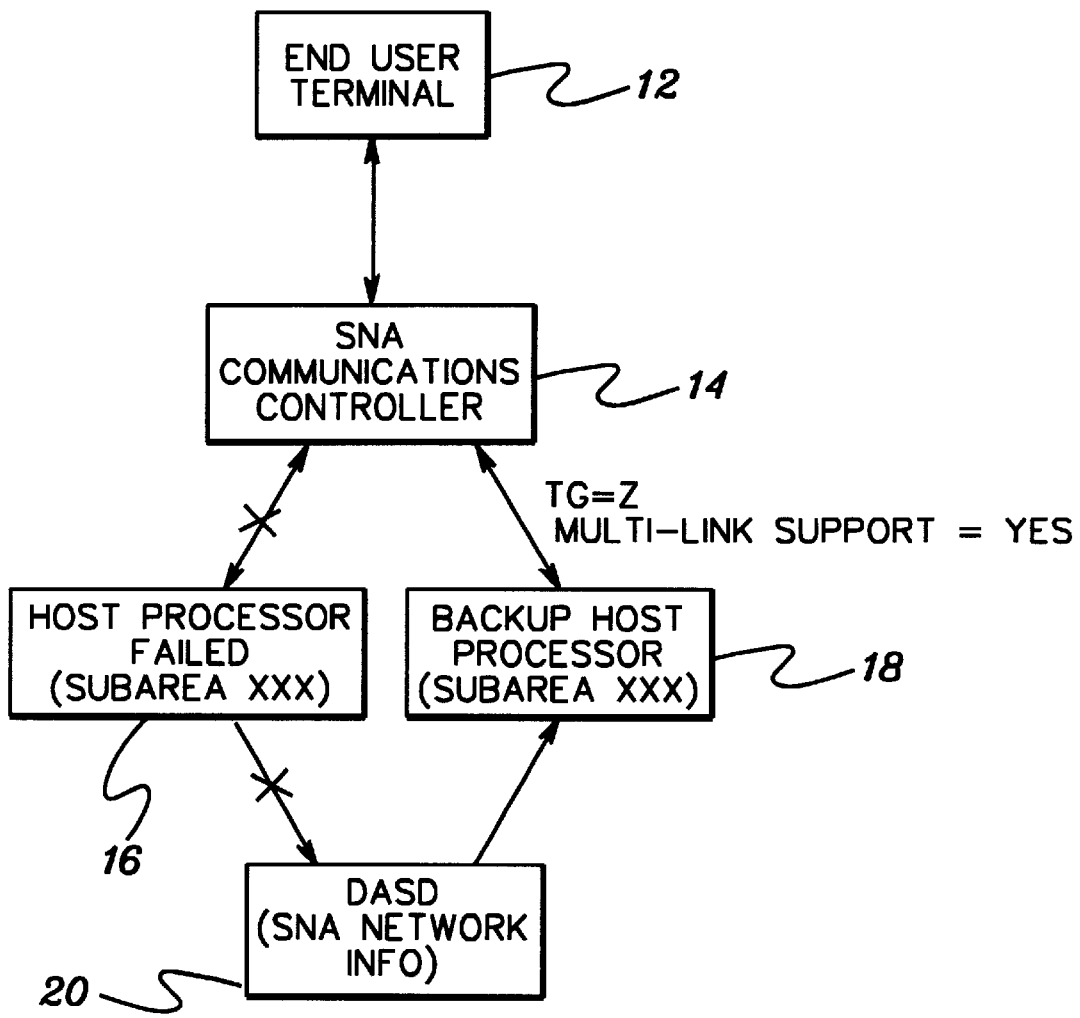
FIG. 3 depicts the SNA network of FIG. 2 showing reading of SNA network information from the persistent storage into the back-up host processor and exchanging of identification information between the back-up host processor and the SNA communications controller in accordance with the principles of the present invention.

As shown in FIG. 3, upon return of this information, processor 18 activates a communication link between itself and communications controller 14. This can be accomplished via operator message, via a command script, or done automatically by the host processor 18 when it determines from the SNA information that the failing host processor had an active link to the communications controller 14. The new host processor supplies the same exchange id format 2 information, i.e., subarea xxx, TG number=z, and multi-link TG support, as the original host processor.

At this point, communications controller 14 is aware that the link between controller 14 and failing host processor 16 has stalled. This may be detected by the controller itself or by a systems operator detecting that no SNA traffic is being sent over the link. After stalling of the original link, any SNA traffic destined for host processor 16 is queued within the controller 14.

Figure 4:
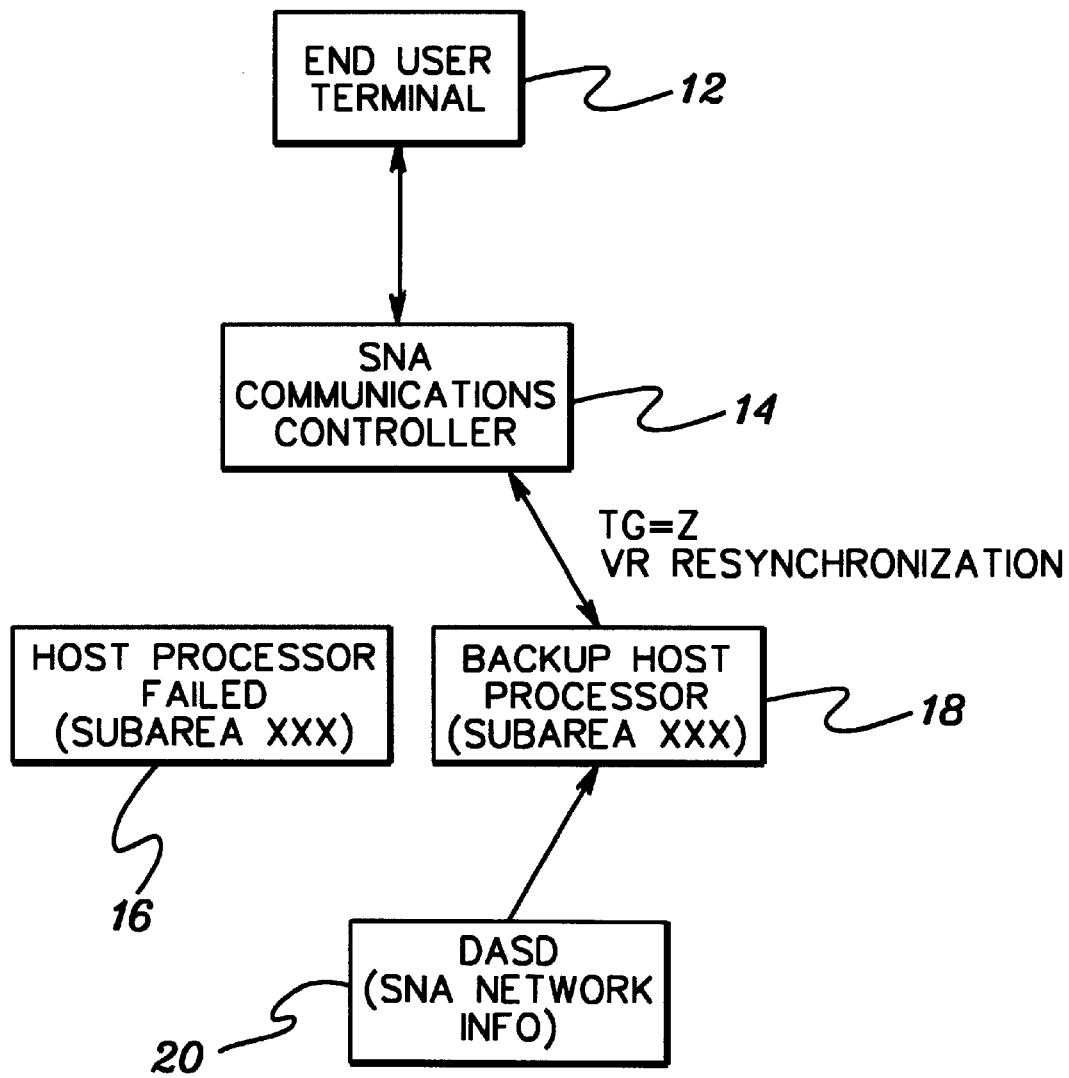
FIG. 4 depicts the SNA network of FIG. 3 showing reading of the failed host processor virtual route information from persistent storage into the back-up host processor and virtual route resynchronization between the back-up host processor and the SNA communications controller in accordance with the principles of the present invention.

The new host 18 next does a virtual route resynchronization process to have the communications controller inform host processor 18 of the correct virtual route sequence numbers to use on its PIUs. This guarantees that the subsequent SNA traffic sent by the new host processor to the communications controller will not be discarded. Virtual route resynchronization is described in detail in commonly assigned U.S. Pat. No. 5,894,547, the entirety of which is hereby incorporated herein by reference. FIG. 4 depicts virtual route resynchronization.

Host processor 18 can now start receiving SNA traffic from controller 14 and can send back responses. The LU TERMINAL, for example, end-user terminal 12, can send a message into APPLHOST and APPLHOST can send back a reply. From LU TERMINAL's perspective, there was no loss of connectivity, only a short delay in sending or receiving data. That delay is far less than a full network outage that would include restarting the LU—LU session to APPLHOST.

Note that for LU—LU sessions, there is no guarantee that the current information filed out by the original, failing host processor 16 is completely current. If it is not, the LU—LU sessions would have to undergo their own resynchronization process, which varies depending upon the LU type involved. Certain LU types simply exchange LU—LU session sequence numbers and continue, while other LU types require that the session be deactivated and restarted. One skilled in the art will understand the LU—LU session resynchronization process.

To restate, a recovery facility is provided herein for an SNA network, which employs an existing SNA communications controller. Multi-link TG support is adapted for use by the existing protocol used by a host processor to an NCP link. Multi-link TG support provides the ability to have multiple "backup" links with one such backup link being a new link brought up between a new processor and the NCP already connected to the failed processor. This new link uses the same transmission group number and subarea during link activation processing, but no SNA data traffic (Path Information Units) would be sent on this new link until the initial link on the failed processor is either declared inoperative, for example, via a timeout mechanism, or is explicitly deactivated by a network operator command, e.g., from VTAM. Once the failed processor's link is taken down, any SNA traffic queued to that link within the controller would be swung to the new link on the new processor and all future traffic would also use the new link. When the new link has been activated and the first inbound PIU has been received from the NCP, virtual route resynchronization as described above would then be done for each active virtual route that has been in use on the failed processor. This allows the host to obtain the correct virtual route (VR) sequence numbers to use for PIUs. Note that the solution presented herein works for both single processor systems as well as a processor within a loosely coupled complex of processors.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A recovery method for a system network architecture (SNA) communication network, said method comprising:
   bringing up a backup processor upon detection of a failing processor in the SNA network, wherein both the failing processor and the backup processor support a multi-link transmission group (TG); and
   activating a new communication link between the backup processor and an SNA communications controller previously linked to the failing processor, wherein the SNA communications controller recognizes that the new communication link to the backup processor is a same subarea address, a same virtual route and a same TG number as the previous link to the failing processor, thereby accomplishing substitution of the backup processor for the failing processor in the SNA communication network.

2. The method of claim 1, wherein said activating comprises automatically activating said new communication link responsive to bringing up of said backup processor.

3. The method of claim 1, further comprising accomplishing bringing up of said backup processor and said activating of said new communication link without an end user experiencing outage of said SNA communication network, wherein said end user is connected to said SNA communication network via a terminal coupled to said SNA communications controller.

4. The method of claim 1, wherein prior to failing, said method comprises periodically storing, by the failing processor, logical unit session and virtual route information to persistent storage, and wherein said method further comprises retrieving, by the backup processor, the logical unit session and virtual route information from persistent storage, and wherein the activating comprises employing the retrieved logical unit session and virtual route information in activating the new communication link between the backup processor and the SNA communications controller.

5. The method of claim 1, further comprising detecting failure of said failing processor by ascertaining that a link between the failing processor and the SNA communications controller has stalled.

6. The method of claim 5, further comprising queueing messages at the SNA communications controller destined for the failing processor upon detecting stalling of the link between the failing processor and the SNA communications controller, and thereafter forwarding the queued messages to the backup processor subsequent to activation of the new communication link between the backup processor and the SNA communications controller.

7. The method of claim 1, wherein said activating comprises performing, by the backup processor, a virtual route resynchronization process to have the SNA communications controller inform the backup processor of correct virtual route sequence numbers to be employed with its path information units (PIUs).

8. The method of claim 1, wherein said activating comprises performing an exchange identification format two (XID2) between the backup processor and the SNA communications controller in establishing the new communication link between the backup processor and the SNA communications controller.

9. A recovery system for a system network architecture (SNA) communication network, said system comprising:
   means for bringing up a backup processor upon detection of a failing processor in the SNA network, wherein both the failing processor and the backup processor support a multi-link transmission group (TG); and means for activating a new communication link between the backup processor and an SNA communications controller previously linked to the failing processor, wherein the SNA communications controller recognizes that the new communication link to the backup processor is a same subarea address, a same virtual route and a same TG number as the previous link to the failing processor, thereby accomplishing substitution of the backup processor for the failing processor in the SNA communication network.

10. The system of claim 9, wherein said means for activating comprises means for automatically activating said new communication link responsive to bringing up of said backup processor.

11. The system of claim 9, further comprising means for accomplishing bringing up of said backup processor and said means for activating of said new communication link without an end user experiencing outage of said SNA communication network, wherein said end user is connected to said SNA communication network via a terminal coupled to said SNA communications controller.

12. The system of claim 9, wherein said system further comprises means for periodically storing prior to failing, by the failing processor, logical unit session and virtual route information to persistent storage, and wherein said system further comprises means for retrieving, by the backup processor, the logical unit session and virtual route information from persistent storage, and wherein the means for activating comprises means for employing the retrieved logical unit session and virtual route information in activating the new communication link between the backup processor and the SNA communications controller.

13. The system of claim 9, further comprising means for detecting failure of said failing processor by ascertaining that a link between the failing processor and the SNA communications controller has stalled.

14. The system of claim 13, further comprising means for queueing messages at the SNA communications controller destined for the failing processor upon detecting stalling of the link between the failing processor and the SNA communications controller, and thereafter means for forwarding the queued messages to the backup processor subsequent to activation of the new communication link between the backup processor and the SNA communications controller.

15. The system of claim 9, wherein said means for activating comprises means for performing, by the backup processor, a virtual route resynchronization process to have the SNA communications controller inform the backup processor of correct virtual route sequence numbers to be employed with its path information units (PIUs).

16. The system of claim 9, wherein said means for activating comprises means for performing an exchange identification format two (XID2) between the backup processor and the SNA communications controller in establishing the new communication link between the backup processor and the SNA communications controller.

17. A recovery system for a system network architecture (SNA) communication network, said system comprising:
 a backup processor adapted to be brought up upon detection of a failing processor in the SNA network, wherein both the failing processor and the backup processor support a multi-link transmission group (TG); and
 an SNA communications controller previously linked to the failing processor, wherein the backup processor and the SNA communications controller are adapted to activate a new communication link therebetween upon detection of the failing processor, wherein said SNA communications controller recognizes that the new communication link to the backup processor is a same subarea address, a same virtual route and a same TG number as the previous link to the failing processor, thereby accomplishing substitution of the backup processor for the failing processor in the SNA communication network.

18. At least one program storage device readable by a machine tangibly embodying at least one program of instructions executable by the machine to perform a recovery method for a system network architecture (SNA) communication network, said method comprising:
 bringing up a backup processor upon detection of a failing processor in the SNA network, wherein both the failing processor and the backup processor support a multi-link transmission group (TG); and
 activating a new communication link between the backup processor and an SNA communications controller previously linked to the failing processor, wherein the SNA communications controller recognizes that the new communication link to the backup processor is a same subarea address, a same virtual route and a same TG number as the previous link to the failing processor, thereby accomplishing substitution of the backup processor for the failing processor in the SNA communication network.

19. The at least one program storage device of claim 18, wherein said activating comprises automatically activating said new communication link responsive to bringing up of said backup processor.

20. The at least one program storage device of claim 18, further comprising accomplishing bringing up of said backup processor and said activating of said new communication link without an end user experiencing outage of said SNA communication network, wherein said end user is connected to said SNA communication network via a terminal coupled to said SNA communications controller.

21. The at least one program storage device of claim 18, wherein prior to failing, said method comprises periodically storing, by the failing processor, logical unit session and virtual route information to persistent storage, and wherein said method further comprises retrieving, by the backup processor, the logical unit session and virtual route information from persistent storage, and wherein the activating comprises employing the retrieved logical unit session and virtual route information in activating the new communication link between the backup processor and the SNA communications controller.

22. The at least one program storage device of claim 18, further comprising detecting failure of said failing processor by ascertaining that a link between the failing processor and the SNA communications controller has stalled.

23. The at least one program storage device of claim 22, further comprising queueing messages at the SNA communications controller destined for the failing processor upon detecting stalling of the link between the failing processor and the SNA communications controller, and thereafter forwarding the queued messages to the backup processor subsequent to activation of the new communication link between the backup processor and the SNA communications controller.

24. The at least one program storage device of claim 18, wherein said activating comprises performing, by the backup processor, a virtual route resynchronization process to have the SNA communications controller inform the backup processor of correct virtual route sequence numbers to be employed with its path information units (PIUs).

25. The at least one program storage device of claim 18, wherein said activating comprises performing an exchange identification format two (XID2) between the backup processor and the SNA communications controller in establishing the new communication link between the backup processor and the SNA communications controller.

* * * * *